(12) United States Patent
Hill et al.

(10) Patent No.: US 12,234,777 B2
(45) Date of Patent: Feb. 25, 2025

(54) OFFSET CLUTCH MECHANISM FOR ELECTRIC STARTING AND BARRING MOTOR OF A GAS-TURBINE ENGINE

(71) Applicants: Rolls-Royce Corporation, Indianapolis, IN (US); Rolls-Royce North American Technologies, Inc., Indianapolis, IN (US)

(72) Inventors: Mathew Hill, Indianapolis, IN (US); Michael Joseph Kabbes, Indianapolis, IN (US); Erik A. Munevar, Indianapolis, IN (US); Peter Schenk, Indianapolis, IN (US); Jacob Ward Harral, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 52 days.

(21) Appl. No.: 18/168,947

(22) Filed: Feb. 14, 2023

(65) Prior Publication Data
US 2024/0271574 A1 Aug. 15, 2024

(51) Int. Cl.
*F02C 7/268* (2006.01)
*F01D 25/36* (2006.01)
(Continued)

(52) U.S. Cl.
CPC ............... *F02C 7/36* (2013.01); *F01D 25/36* (2013.01); *F02C 7/268* (2013.01); *F16D 11/14* (2013.01)

(58) Field of Classification Search
CPC .. F02C 7/268; F02C 7/275; F02C 7/32; F02C 7/36; F01D 25/36
See application file for complete search history.

(56) References Cited

U.S. PATENT DOCUMENTS 2,869,700 A * 1/1959 Bowden .................. F02C 7/275
192/109 R
2,908,170 A * 10/1959 Schindel ................. F02C 7/275
74/7 C (Continued)

OTHER PUBLICATIONS

Extended Search Report from counterpart European Application No. 23204292.9 dated Apr. 12, 2024, 8 pp.

(Continued)

*Primary Examiner* — Gerald L Sung
(74) *Attorney, Agent, or Firm* — Shumaker & Sieffert, P.A.

(57) ABSTRACT

In examples, a clutch assembly includes a first clutch member disposed near a first end of a first shaft. The first clutch member defines a first surface. The first shaft includes a starter motor coupled to a second end of the first shaft. The clutch assembly includes a second clutch member disposed near a first end of a second shaft. The second clutch member defines a second surface opposing the first surface, and the second shaft includes an accessory gearbox of a gas turbine engine coupled to a second end of the second shaft. The surfaces of the first and second clutch member engage such that rotational motion is transferred between the first clutch member and the second clutch member. The first clutch member and the second clutch member are configured to passively disengage from each other and actively reengage with each other.

19 Claims, 6 Drawing Sheets

(51) Int. Cl.
*F02C 7/36* (2006.01)
*F16D 11/14* (2006.01)

(56) References Cited

U.S. PATENT DOCUMENTS

| | | | | |
|---|---|---|---|---|
| 2,942,481 | A | * | 6/1960 | Gilbert .................... F02C 7/275 |
| | | | | 464/30 |
| 3,350,060 | A | | 10/1967 | Fleur et al. |
| 4,450,943 | A | * | 5/1984 | Long, Jr. ............... F16D 25/044 |
| | | | | 192/101 |
| 6,216,440 | B1 | * | 4/2001 | Zipperer ................ A63H 27/14 |
| | | | | 60/788 |
| 8,350,398 | B2 | | 1/2013 | Butt |
| 8,746,426 | B2 | | 6/2014 | Petzold et al. |
| 8,881,533 | B2 | | 11/2014 | Copeland |
| 10,422,243 | B2 | | 9/2019 | Suciu et al. |
| 2004/0079610 | A1 | * | 4/2004 | Ooka ....................... B21K 1/30 |
| | | | | 192/108 |
| 2004/0107703 | A1 | * | 6/2004 | Gustafson ............... F02C 7/275 |
| | | | | 60/788 |
| 2018/0112723 | A1 | * | 4/2018 | Pando Rodriguez .... H02K 7/10 |

OTHER PUBLICATIONS

Luu et al., "A Design Approach Considering Axial Asymmetry Position of Rotor to Stator in Permanent Magnet Synchronous Motor for Compact Size", 2018 21st International Conference on Electrical Machines and Systems (ICEMS), Oct. 2018, 4 pp.
Wikipedia, "Belleville washer", Feb. 8, 2023, 6 pp.
Wikipedia, "Sprag clutch", Feb. 8, 2023, 4 pp.
Wikipedia, "Wave Spring", Feb. 8, 2023, 3 pp.

* cited by examiner

OFFSET CLUTCH MECHANISM FOR ELECTRIC STARTING AND BARRING MOTOR OF A GAS-TURBINE ENGINE

TECHNICAL FIELD

The present disclosure generally relates to clutch assemblies and systems that include the same.

BACKGROUND

Gas turbine engines include various accessory components to enable the engine to operate, such as, for example, fuel pumps, oil pumps, and electric generators and/or motors. Often, accessory components are driven by a turbine through an accessory gearbox. In some implementations, accessory components are rotationally coupled to the accessory gearbox using a mechanical clutch, which allows selective disconnection of the accessory components from the gearbox and turbine when the accessory components are not needed.

SUMMARY

The disclosure describes a clutch assembly which includes a first clutch member disposed near a first end of a first shaft. The first clutch member defines a first surface, and a starter motor coupled to a second end of the first shaft. The clutch assembly includes a second clutch member disposed near a first end of a second shaft. The second clutch member defines a second surface opposing the first surface, and an accessory gearbox of a gas turbine engine coupled to a second end of the second shaft. When the first clutch member is engaged with the second clutch member, the first surface of the first clutch member engages the second surface of the second clutch member such that rotational motion is transferred between the first clutch member and the second clutch member. The first clutch member and the second clutch member are configured to passively disengage from each other and actively reengage with each other.

The disclosure also describes techniques for operating a clutch assembly. The technique includes engaging, at a first time, a first clutch member and a second clutch member. The first clutch member is disposed near a first end of a first shaft. The first clutch member defines a first surface, and a starter motor is coupled to a second end of the first shaft. The second clutch member is disposed near a first end of a second shaft. The second clutch member defines a second surface opposing the first surface. An accessory gearbox of a gas turbine engine is coupled to a second end of the second shaft. When the first clutch member is engaged with the second clutch member, the first surface of the first clutch member engages the second surface of the second clutch member such that rotational motion is transferred between the first clutch member and the second clutch member. The technique also includes passively disengaging, at a second time that is after the first time, the first clutch member and the second clutch member. The technique includes actively reengaging, at a third time that is after the second time, the first clutch member and the second clutch member.

DETAILED DESCRIPTION

The present disclosure is directed to gas-turbine engine systems, e.g., for gas-turbine engine powered vehicles such an aircraft, and techniques for operating the same. For ease of description, examples of the disclosure will be primarily described in the context of aircraft as a gas-turbine engine powered vehicle. However, examples of the disclosure are not limited to aircraft. For instance, aspects of this disclosure may be applicable to gas-turbine powered ground vehicles, watercraft, and the like.

Starting a gas turbine engine may require rotation of a compressor to a speed that provides sufficient pressurized air into combustion chambers of the gas turbine engine. Accordingly, energy for starting the gas turbine engine may be supplied by another source separate from the gas turbine engine, which may be a starter motor. The starter motor may use power from internal combustion, electric power, or other suitable power source to turn a first shaft, which may be mechanically coupled to an accessory gearbox of the gas turbine engine via a clutch assembly to the gas turbine engine, such that shaft work output by the starter motor may be used to start the gas turbine engine by rotating a compressor mechanically fixed to the first shaft, which is turned by the starter motor.

The starter motor may also be used in barring applications. In a barring application, which may occur at the tail end of a gas turbine operation (e.g., a flight) or after an operation of the gas turbine engine, the gas turbine engine may be shut off or powered down. However, to more uniformly cool components of the gas turbine engine, shaft work from the starter motor may cause portions of the gas turbine engine to slowly rotate (e.g., relative to the rotation of the gas turbine engines during propulsion operations) to promote heat transfer from relatively hot portions of the gas turbine engine to relatively cooler portions. As such, the starter motor may provide the dual-purpose of starting the gas turbine engine before a propulsion operation and barring the gas turbine engine at the conclusion of the propulsion operation.

In some examples, the starter motor may be permanently mechanically coupled and be rotationally fixed to the gas turbine engine. In such examples, one or more rotationally fixed shafts may mechanically couple an accessory gearbox of the gas turbine engine and the starter motor, so that the gas turbine engine and the start motor are configured to rotate simultaneously. Such an arrangement may disadvantageously drive rotational motion of the starter motor when the starter motor is not needed for either starting or barring operations. During these time periods, permanent magnets in the starter motor may induce a current in a stator of the starter motor, which may generate heat. Unnecessarily moving parts and excessive heat may cause component fatigue which may shorten the useful life of components, and/or may cause a performance penalty (e.g., increased fuel burn), or may present other failure modes or degraded operation.

For safety and reliability, it may be desired to disengage the starter motor from the accessory gearbox during operations when the starter motor is not needed (e.g., propulsion operations of the gas turbine engine), and to engage or reengage the starter motor during operations when the starter motor is needed (e.g., starting and/or barring applications). In this way, unnecessary rotation of the starter motor and the associated generation of heat may be reduced or minimized. A clutch assembly may be used to disengage a first shaft associated with the starter motor from a second shaft associated with the accessory gearbox of the gas turbine engine. In some examples, the clutch assembly may be an active clutch assembly which uses control circuitry of a controller to send a signal to actuate a clutch mechanism to disengage or engage the clutch. The actuation of the clutch mechanism may be electromagnetic, hydraulic, pneumatic, or the like. Active clutch arrangements may disadvantageously add weight and/or complexity to the mechanical system. Additionally, active clutch arrangements may be prone to failure due to one or more components or processes of the complex systems breaking down.

Clutch assemblies according to the present disclosure may address one or more of the disadvantages associated with conventional clutch systems. For example, clutch assemblies according to the present disclosure may be configured to passively disengage the starter motor from the accessory gearbox of the gas turbine engine. Passive disengagement, as described herein, means that the clutch assembly is configured to mechanically disengage without a signal from control circuitry of a controller when a torque associated with the gas turbine engine exceeds a threshold level. In some examples, the threshold level may be reached when the torque from the gas turbine engine exceeds the torque from the starter motor. The passive clutch assembly may reduce or eliminate components necessary for active disengagement of the clutch, and accordingly may reduce the weight of the clutch assembly.

In some examples, the starter motor may be configured to apply a torque to the first shaft which causes the first shaft to rotate about a first shaft central axis, and the accessory gearbox may be configured to apply a torque to the second shaft which causes the second shaft to rotate about a second shaft central axis. The first clutch member and the second clutch member may be configured to passively disengage from each other when the torque of the second shaft exceeds the torque of the first shaft. In this way, the starter motor may supply the energy necessary to start the gas turbine engine, but may disengage from the gas turbine engine once it has started so that the starter motor does not run in "whirl" mode throughout the entire operation of the gas turbine engine. "Whirl" mode may involve the starter motor spinning without energy input, due to rotation of the second shaft. Running the starter motor in whirl be leaving the starter motor engaged to the gas turbine engine after the gas turbined engine has started may have deleterious effects including efficiency losses, heat generation, or the like.

Clutch assemblies according to the present disclosure may actively reengage the clutch assembly. Active reengagement, as used herein, means that the clutch assembly is configured to reengage the first surface of the first clutch member and the second surface of the second clutch member via a signal from control circuitry of a controller. Engagement of the first surface and the second surface may cause frictional engagement of the first clutch member and the second clutch member such that rotational motion may be transferred between the clutch members. In some examples, the first surface and the second surface may lock together such that there is no relative motion or substantially no relative motion between the first surface and the second surface when the clutch assembly is completely engaged.

Rather than relying on a separate actuation system, the axially offset permanent magnets of the starter motor may combine to provide an axial force for reengagement of the clutch assembly when the starter motor is energized. The misalignment of two axial electrical centers (one on the rotor with its permanent magnets and one on the stator) may cause an axial force sufficient to bring the clutch assembly together for reengagement. This phenomenon may be called the axial attractive force (AAF). In this way, a signal may energize the starter motor, and may cause the first shaft to translate axially from a disengaged position where the first and second clutch members are not in contact to an engaged position where the first and second clutch members contact each other and interface to translate rotational motion between them.

In some examples, the first clutch member may include a plurality of helical splines disposed spirally about the circumference of the first shaft, and the second clutch member may include a hub defining a plurality of helical grooves configured to receive the helical splines, or vice versa. The helical splines may get more engaged (e.g., translate axially further into the hub) as the starter motor provides more torque, and disengage as the starter motor torque diminishes, disengaging when the torque direction reverses (i.e., the torque exerted on the second shaft by the gas turbine engine exceeds the torque exerted on the first shaft by the starter motor). A helical spline/hub arrangement of the first and second clutch members may advantageously provide increased surface area for engagement because the helical splines and grooves may engage each other over an axial length. The increased surface area for engagement may efficiently transfer rotational motion between the clutch members, while reducing material stresses relative to other types of clutch members. Additionally, or alternatively in some examples, the first clutch member and the second clutch member may be opposing lock plates, which may advantageously allow for high stress engagement over a lower axial length. When the distance between the engagement position and disengagement position of the first shaft is less than a threshold distance (e.g., about 5 millimeters), a lock plate arrangement may be desirable.

In some examples, clutch assemblies according to the present disclosure may include a speed matching system that may be activated before or during reengagement of the first clutch member and the second clutch member to reduce the probability of a jam or damage to one or more components. The speed matching system may include a speed sensor on each of the first shaft and the second shaft. The speed matching system may be configured to control the starter motor, while the first clutch member and second clutch member are disengaged, to rotate the first shaft about a first shaft central axis at substantially the same rotational speed that the second shaft is rotating about a second shaft central axis. In this way the first clutch member and the second clutch member may be rotating at substantially the same rotational speed when they actively reengage with each other. Substantially the same speed, as described herein, may be an equal rotational speed or a rotational speed within plus or minus 10 percent. It should also be noted that as used herein, relational terms, such as "first" and "second," "over" and "under," "front" and "rear," and the like, may be used solely to distinguish one entity or element from another entity or element without necessarily requiring or implying any physical or logical relationship or order between such entities or elements.

Figure 1:
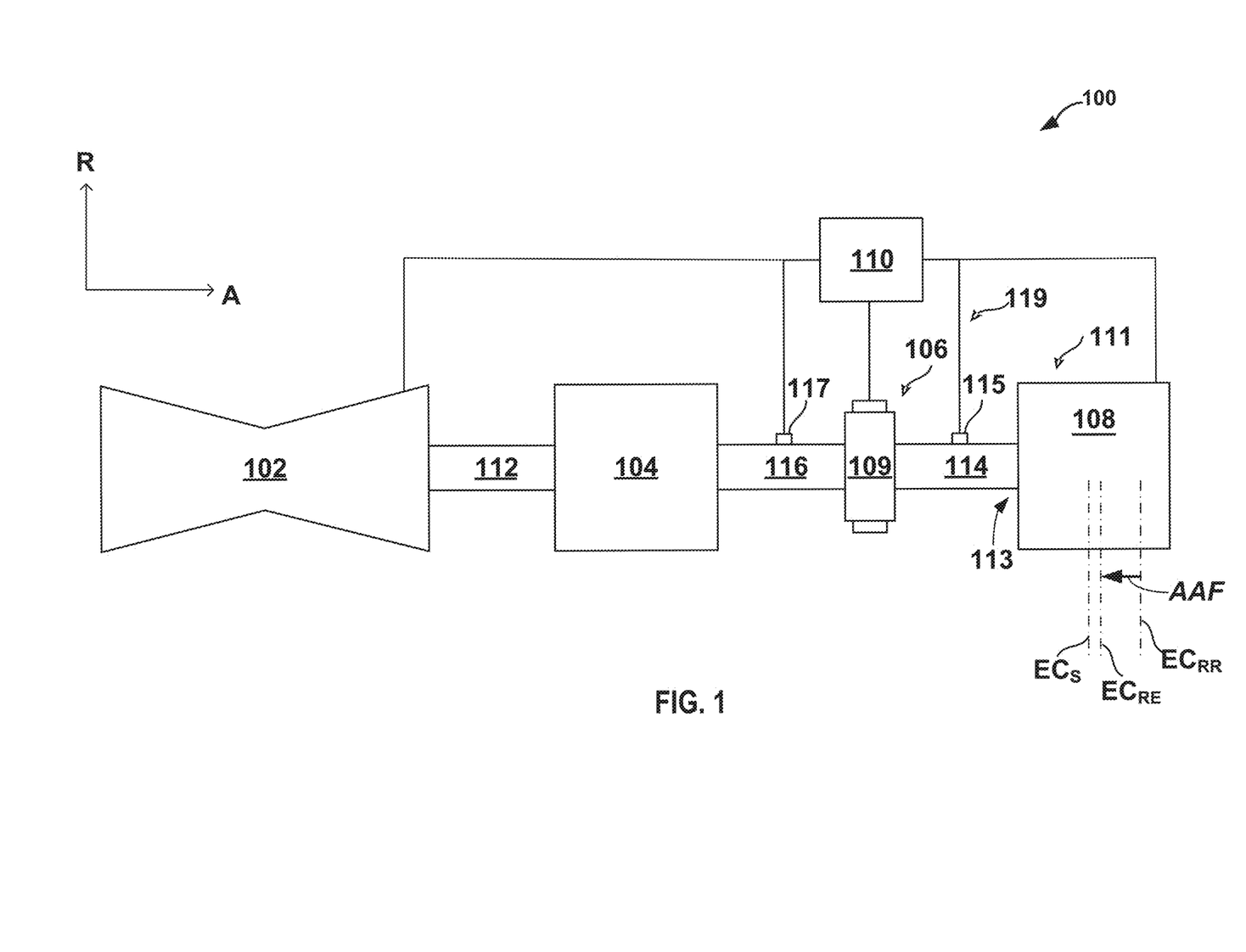
FIG. 1 is a conceptual diagram illustrating an example clutch assembly according to the present disclosure.

FIG. 1 is a conceptual diagram illustrating an example system 100 including clutch assembly 106. System 100 may include, for example, a starter motor 108 (motor 108) coupled to a first shaft 114, an engine 102, a drive shaft 112, an accessory gear box 104 coupled to a second shaft 116, a clutch assembly 106, and a controller 110. As will be described further below, clutch assembly 106 includes two clutch members 109 (individually shown as first clutch member 122 and second clutch member 124 in FIG. 2A for example). System 100 may include any suitable mechanical system, mobile or stationary. In some examples, system 100 may include at least a portion of a mechanical system of a vehicle (e.g., an aircraft, a boat, a truck, etc.) powered by an internal combustion engine. In some examples, system 100 may include a gas turbine engine, whether the gas turbine engine is stationary and used for industrial purposes or attached to a vehicle. As one specific example, system 100 may include at least a portion of a mechanical system of an aircraft powered by a gas turbine engine. For instance, system 100 may form a part of a system that includes an aircraft engine (e.g., turbine engine) that drives a reduction gearbox.

Engine 102 may be mechanically coupled to accessory gear box 104 via drive shaft 112. Engine 102 is configured to rotate (e.g., drive) drive shaft 112.

Drive shaft 112 may include any suitable shaft and/or gear system to transfer shaft work from engine 102 to accessory gear box 104. In examples in which engine 102 includes a gas turbine engine, drive shaft 112 may include an internal gearbox including a direct drive, a stub shaft drive, an idler shaft drive, or other mechanical coupling configured to drive a radial drive shaft or tower shaft. In some examples, drive shaft 112 may include an intermediate gearbox.

Accessory gearbox 104 is configured to transfer shaft work from drive shaft 112 to second shaft 116 and vice versa. In some examples, accessory gearbox 104 may include an accessory drive of a gas turbine engine system. Although illustrated as a single second shaft 116, system 100 may include two or more input shafts driven by drive shaft 112 via accessory gearbox 104. For example, accessory gearbox 104 may include a plurality of spur gears mechanically coupling drive shaft 112 to respective input shafts of a plurality of auxiliary gearbox mechanisms such as oil pumps, fuel pumps, alternators, etc (not shown), each at a selected gear ratio.

Starter motor 108 is configured to rotate (e.g., drive) first shaft 114. Starter motor 108 may include any suitable motor to output shaft work, such as one or more internal combustion engines, fuel cells, electric motors or generators, pneumatic motors, or hydraulic motors. Starter motor 108 may start gas turbine engine 102 by driving first shaft 114. Starter motor 108 may include stator 111 and rotor 113. In some examples, In some examples, rotor 113 may be a "floating" rotor which is allowed to translate axially back and forth along arrow A in FIG. 1. Stator 111 may include one or more permanent magnets configured to generate a magnetic field that causes rotor 113 to rotate when energy is supplied to starter motor 108. Stator 111 may define an electrical center, which may be positioned at the center of the axial length of the magnetic elements of stator 111 and labeled $EC_S$ in FIG. 1.

Similarly, rotor 113 may define an electrical center, which may be positioned at the center of the axial length of the magnetic elements of rotor 113. At a rest position when starter motor 108 is not energized, the electrical center of rotor 113, labeled $EC_{RR}$ in FIG. 1, may be offset or displaced from the electrical center of stator $EC_S$ in an axial direction. When energy is supplied to starter motor 108, magnetic attraction, which may be called the axial attractive force and labeled AAF in FIG. 1, between magnetic elements in stator 111 and rotor 113 may cause axial translation of rotor 113 such that the electrical center of rotor 113 when starter motor 108 is energized translates to the position labeled $EC_{RE}$ in FIG. 1. Although illustrated as slightly axially separated in FIG. 1, in some examples $EC_S$ and $EC_{RE}$ may occupy the same axial position.

Rotor 113 may be mechanically coupled to first shaft 114 such that rotational motion of rotor 113 is transferred to first shaft 114, causing rotation of first shaft 114. Similarly, axial translation of rotor 113 may be transferred to first shaft 114 such that first shaft 114 may translate axially to engage clutch assembly 106 when power is supplied to starter motor 108. The rotational motion of first shaft 114 may be transferred by clutch assembly 106 to second shaft 116, then through accessory gearbox 104 into drive shaft 112. In this way, while the first and second clutch members 122, 124 (shown in FIG. 2A) of clutch assembly 106 are engaged, system 100 may be operated such that either starter motor 108 drives rotation of gas turbine engine 102, or vice versa.

For example, to start gas turbine engine 102, first shaft 114 may be selectively coupled to second shaft 116 via clutch assembly 106 so that second shaft 116 is rotationally driven by first shaft 114 when clutch assembly 106 is engaged and, conversely, when clutch assembly 106 is disengaged, second shaft 116 is not driven by first shaft 114. First shaft 114 may be coupled (e.g., rotationally fixed) to first clutch member 122 (shown in FIG. 2A) of clutch assembly 106, and second clutch member 124 (shown in FIG. 2A) of clutch assembly 106 may be coupled (e.g., rotationally fixed) to second shaft 116. Although system 100 is described herein primarily with first clutch member 122 being fixed to first shaft 114 and with second clutch member 124 being fixed to second shaft 116, in other examples, first clutch member 122 may be fixed to second shaft 116 and second clutch member 124 may be fixed to first shaft 114.

In some examples, system 100 may include speed matching system 119. Speed matching system 119 may include at least one of speed sensors 115 and 117. Speed sensors 115 and 117 are configured to sense a rotational speed of first shaft 114 (or a clutch member coupled to first shaft 114) and second shaft 116 (or a clutch member coupled to second shaft 116), respectively. For example, speed sensors 115 and/or 117 may include one or more of a reflective sensor, an interrupter sensor, an optical encoder, a variable-reluctance sensor, an eddy-current killed oscillator sensor, a Wiegand sensor, or a Hall-effect sensor. In some examples, speed sensors 115 and/or 117 may be configured to determine a rotation of first shaft 114 or second shaft 116, respectively, based on sensing a target disposed on input shaft 114 (or the first clutch member) or second shaft 116 (or the second clutch member). In some examples, controller 110 may be configured to receive signals from at least one of speed sensors 115 or 117 and control, based on a rotational speed determined based on the signal, power supplied to starter motor 108 or gas turbine engine 102 to substantially match the rotational speed to the other shaft, prior to causing engagement of clutch assembly 106.

Figure 2A:
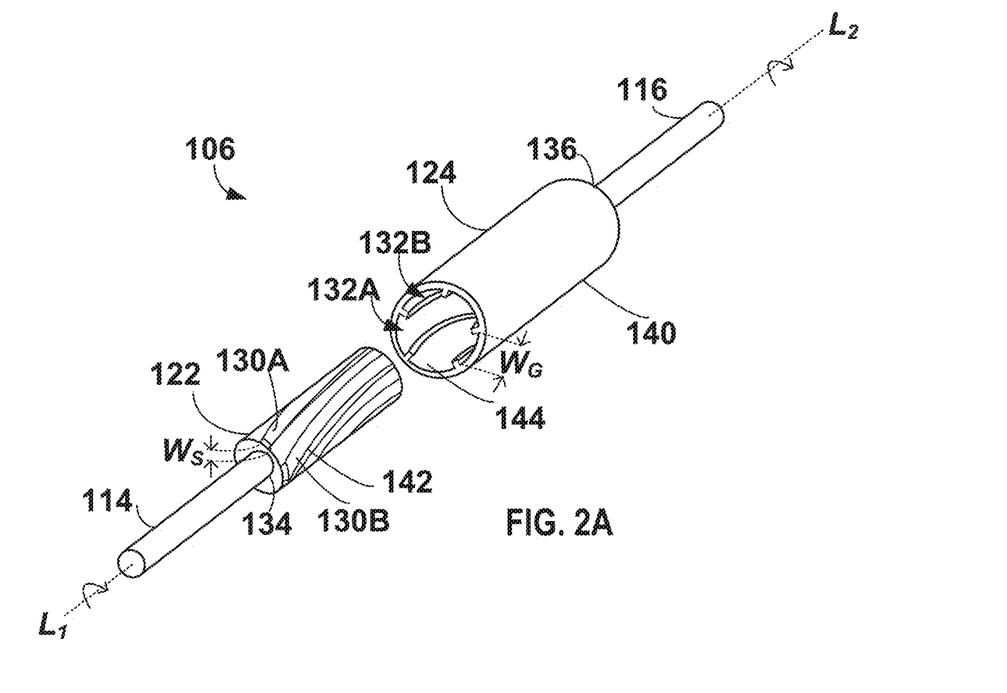
FIG. 2A is a perspective view illustrating a portion of the example clutch assembly of FIG. 1.

FIG. 2A illustrates a portion of clutch assembly 106 of FIG. 1. As mentioned above, clutch assembly 106 includes first clutch member 122 and second clutch member 124.

With concurrent reference to both FIG. 1 and FIG. 2A, first clutch member 122 and second clutch member 124 may be configured to passively disengage from each other and actively reengage with each other, as will be further described below. For example, first clutch member 122 and second clutch member 124 may be configured to passively disengage from each other mechanically without being controlled by control logic of controller 110. In this way, first clutch member 122 and second clutch member 124 may automatically disengage after engine 102 is started and the torque on second shaft 116 exceeds a threshold torque. In some examples, the threshold torque may be the torque on first shaft by starter motor 108.

First clutch member 122 and second clutch member 124 may be configured to actively reengage with each other via a signal from control circuitry of controller 110. To engage clutch assembly 106, controller 110 may move first clutch member 122 towards second clutch member 124 to frictionally engage opposing surfaces of members 122, 124. Controller 110 may send a signal causing selective reengagement of clutch assembly 106 as described herein, e.g., to selectively drive second shaft 116 via first shaft 114, such as in a barring application. For example, as described further below, controller 110 may control the axial position of first clutch member 122 relative to second clutch member 124 as described below. In some examples, to actively reengage first clutch member 122 and second clutch member 124, an electrical center of stator 111 of starter motor 108 and an electrical center of rotor 113 of starter motor 108 may be offset. For example, the electrical centers may be offset in an axial direction (A in FIG. 1). The electrical center of rotor 113 may be further away in an axial direction from clutch assembly 106 than the electrical center of stator 111. Additionally, rotor 113 may be mechanically supported in a way that allows for axial translation of rotor 113. In this way, when power is supplied to starter motor 108, electromagnetic attraction between the electrical centers may cause rotor 113 to translate towards clutch assembly 106 (to the left along axis A in FIG. 1).

When first clutch member 122 is in the disengaged position, energy supplied to starter motor 108 generates an axial force (to the left along axis A in FIG. 1) on first shaft 114 sufficient to reengage first clutch member 122 and second clutch member 124. Advantageously, in some examples, additional electromagnets may be omitted because actuation of the slidable translation of first shaft 114 to the engagement position may be accomplished by energization of starter motor 108. In this way, the permanent magnets of starting motor 108 may be used to actuate translation of first shaft 114 to engage clutch assembly 106.

Controller 110 may include, for example, a computing device, a desktop computer, a laptop computer, a workstation, a server, a mainframe, a cloud computing system, a tablet, a smart phone, or the like. Controller 110 is configured to control operation of system 100, including, for example, the power supplied to starter motor 108 and thus the position of first clutch member 122 relative to second clutch member 124. Controller 110 may be communicatively coupled to the various component of system 100 including, e.g., sensors 115 and/or 117, and/or the like using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, controller 110 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller 110 may be an Electrical Engine Controller (EEC) or Full Authority Digital Engine Controller (FADEC).

FIG. 2A illustrates first clutch member 122 and second clutch member 124 of clutch assembly 106 of FIG. 1 from a perspective view. First clutch member 122 is positioned proximate first end 134 of first shaft 114. Although illustrated as mounted on first end 134 of shaft 114 and extending axially beyond first end 134, in some examples first end 134 of first shaft 114 may extend axially beyond first clutch member 122. Similarly, although second clutch member 124 is illustrated as mounted proximate to first end 136 of second shaft 116, in some examples shaft 116 may extend axially beyond second clutch member 124. Thus, positioned proximate to a first end of shaft 114, when used in this context, means that first clutch member 122 is positioned closer to first end 134 than the distal second opposite end.

First shaft 114 and first clutch member 122 are configured to rotate about first shaft central axis $L_1$ under power from starter motor 108 (FIG. 1), or gas turbine engine 102 (FIG. 1) through accessory gearbox 104 (FIG. 1) when clutch assembly 106 is engaged. Similarly, second shaft 116 and second clutch member 124 are configured to rotate about second shaft central axis $L_2$ when under power from gas turbine engine 102 (FIG. 1) through accessory gearbox 104 (FIG. 1) when clutch assembly 106 is in an engaged state. In some examples, as illustrated, axes $L_1$ and $L_2$ may be collinear, although other arrangements are considered.

In some examples, as illustrated, first clutch member 122 and second clutch member 124 may be arranged such that first clutch member 122 includes a plurality of helical splines 130A, 130B (other helical splines not labeled in FIG. 2A for clarity) (collectively, "helical splines 130") disposed spirally about the circumference of first shaft 114. Helical splines 130 are described as wrapping spirally about first shaft 114, but need not make a full revolution about a circumference of shaft 114. Rather, helical splines 130 need only to curve about a portion of the circumference of shaft 114. Second clutch member 124 may include hub 140. Hub 140 may define a plurality of helical grooves 132A, 132B (other helical grooves not illustrated for clarity) (collectively, "helical grooves 132") configured to receive helical splines 130. First surface 142, which covers first clutch member 122, is configured to contact second surface 144, the interior surface of hub 140, of second clutch member 124. Advantageously, first clutch member 122 may axially translate further into second clutch member 124 when starter motor 108 (FIG. 1) applies more torque to first shaft 114 than gas turbine engine 102 (FIG. 1) applies to second shaft 116, inducing more surface area contact between surfaces 142 and 144. In this way, first clutch member 122 may be configured to screw into second clutch member 124 to axially translate from the disengaged position, where there is no or little contact between surfaces 142 and 144, to an engaged position where there is contact between surfaces 142 and 144 along at least a portion of the axial length of first clutch member 122.

Figure 2B:
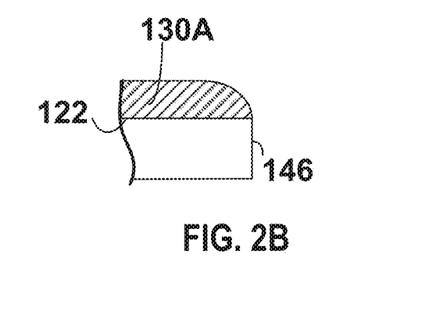
FIG. 2B is a side view of a portion of the first clutch member of FIG. 2A.

Helical splines 130 and/or helical grooves 132 may include one or more optional modifications configured to reduce material stresses induced by engagement of first clutch member 122 and second clutch member 124, and thus may prolong the life of the components of clutch assembly 106. For example, each respective helical spline 130A of helical splines 130 may define spline width $W_S$. Each corresponding helical groove 132A of helical groves 132 may define groove width $W_G$. In some examples, as illustrated, the magnitude of groove width $W_G$ is larger than the magnitude of the spline tooth width $W_S$. In some examples, $W_G/W_S$ may be at least 1.10, or at least about 1.05, which may advantageously allow for translation of helical splines 130 into grooves 132 without excess material stresses. This difference is magnified in the illustration of FIG. 2A for clarity. Additionally, or alternatively, as shown in FIG. 2B, at least one helical spline 130A of a plurality of helical splines 130 may define a bullnose shape at first end 146 of first clutch member 122. The bullnose shape may be a rounded off or angular corner configured to reduces stresses in helical spline 130A during engagement with hub 140. In some examples, as illustrated the bullnose shape defined by spline 130 may mean that helical spline 130A does not include a sharp edge at first end 146, so that damage to hub 140 may be reduced.

Figure 3A:
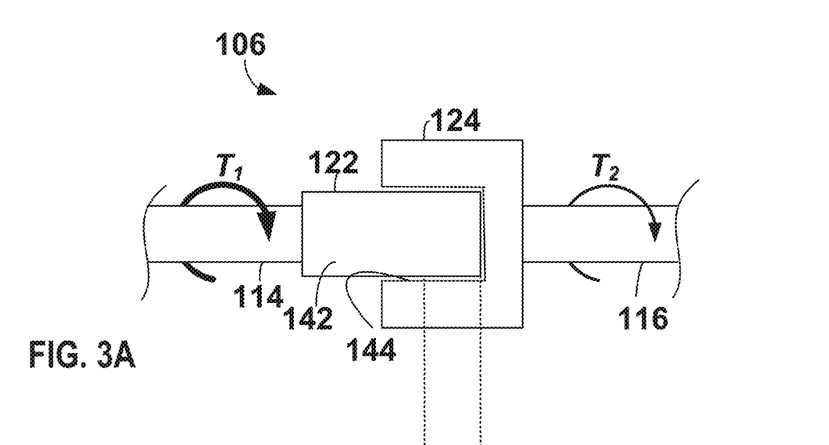
FIG. 3A is a conceptual view illustrating the example clutch assembly of FIG. 2A in an engaged position.
Figure 3B:
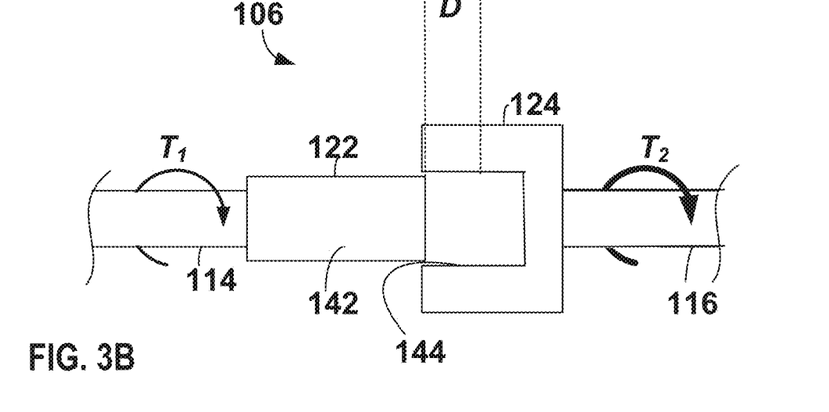
FIG. 3B is a conceptual view illustrating the example clutch assembly of FIG. 2A in a disengaged position.

FIGS. 3A and 3B are schematic side view diagrams illustrating clutch assembly 106 of FIGS. 1 and 2 in an engaged position and a disengaged position, respectively. As illustrated, helical splines 130 are omitted from first clutch member 122, and helical grooves are omitted for second clutch member 124, for clarity. First shaft 114 is configured to slidably translate across distance D to transition between the engaged position illustrated in FIG. 3A, in which at least a portion of first surface 142 of first clutch member 122 is in contact with and opposes second surface 144 of second clutch member 124, and the disengaged position illustrated in FIG. 3B, where surfaces 142, 144, do not oppose.

With concurrent reference to FIGS. 1 and 3A, as described above, starter motor 108 is configured to apply a torque to first shaft 114, illustrated in FIGS. 3A and 3B as force $T_1$. Gas turbine engine 102 is configured to apply a torque to second shaft 116 as force $T_2$. In some examples, as illustrated, torque $T_1$ exceeds torque $T_2$, as illustrated by the thicker arrow in FIG. 3A. In these examples, the energy supplied to starter motor 108 to drive first shaft 114 may cause first shaft 114 to translate axially due to the electrically offset stator 111 and rotor 113, driving first clutch member 122 and second clutch member 124 to be engaged in the illustrated engagement position. Therefore, rotational motion of first clutch member 122 can be transferred to second clutch member 124. As such, starter motor 108 may start gas turbine 102 or reengage gas turbine engine 102 for a barring application.

In some examples, as illustrated in FIG. 3B, torque $T_2$ may exceed torque $T_1$, such as, for example, during a cruise operation where energy is not supplied to starter motor 108 and gas turbine engine 102 is in a propulsion operation. Helical splines 130 (FIG. 2A) of first clutch member 122 may be configured to unthread from helical grooves 132 (FIG. 2) of second clutch member 124. Thus, clutch assembly 106 may be configured to passively disengage without a signal from control circuitry of controller 110. The centripetal force from the relative rotation of second shaft 116 may slidably engage helical splines 130 and helical grooves 132 (FIG. 2A) to translate first shaft 114 relative to second shaft 116, such that first clutch member 122 and second clutch member 124 disengage.

Figure 4A:
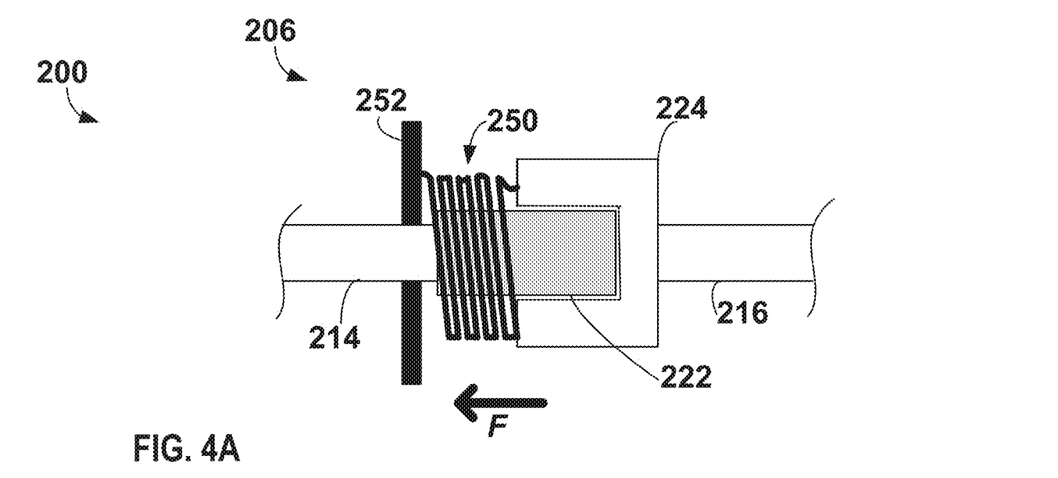
FIGS. 4A and 4B are conceptual views illustrating the clutch assembly of FIGS. 3A and 3B including an optional biasing spring.
Figure 4B:
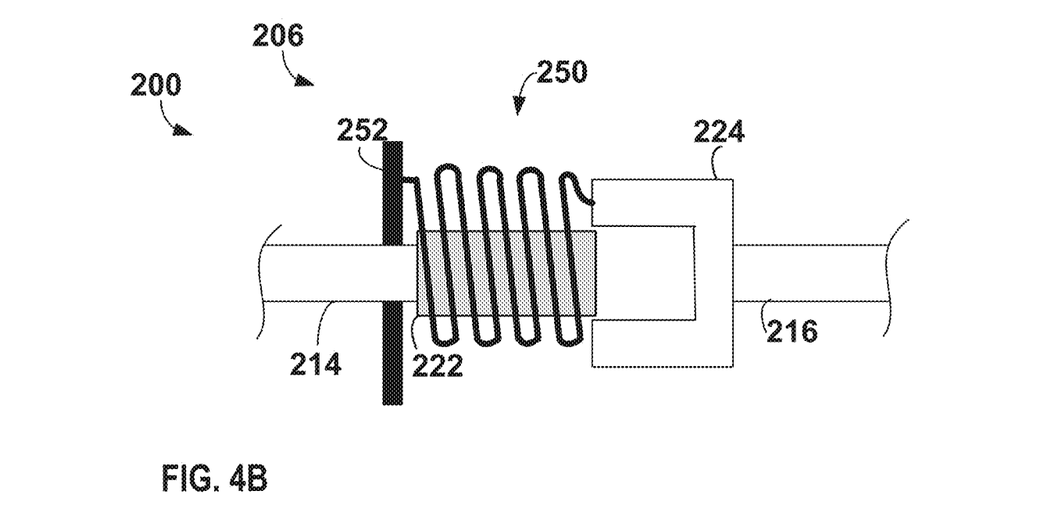

FIGS. 4A and 4B illustrate system 200 including clutch assembly 206. Clutch assembly 206 includes first shaft 214, first clutch member 222. FIGS. 4A and 4B illustrating clutch assembly 206 correspond to FIGS. 3A and 3B illustrating clutch assembly 106 as described above, where similar reference characters indicate similar elements. In this example, clutch assembly 206 includes biasing spring 250.

Biasing spring 250 is configured to assist in passively disengaging first clutch member 222 and second clutch member 224 by applying spring force F. As illustrated, the mechanism for assisting in passive disengagement of clutch assembly 206 is a spring, but other suitable mechanisms are considered. For example, additionally, or alternatively, clutch assembly 206 may include one or more stacking disc springs (e.g., a Belleville washer spring stack), wave springs, spiral spring, centrifugal, or hydraulic pressure systems configured to help push first shaft 214 towards the disengagement position illustrated in FIG. 4B from the engagement position illustrated in FIG. 4A. In the example of FIGS. 4A and 4B, biasing spring 250 is illustrated in a compressed state in FIG. 4A and a default/rest position in FIG. 4B, such that spring force F is acting on first clutch member 222 in FIG. 4A.

Although illustrated as a single spring in the illustrated example, clutch assembly 206 may include more than one biasing spring, such as two, three, or four biasing springs. Although illustrated as an expansion force pushing first clutch member 122 and second clutch member 124 apart in FIGS. 4A and 4B, spring force F may be a contraction force in other examples. Spring force F is configured to assist in passively disengaging clutch assembly 206 by being configured to assist in translating first shaft 214 from the engagement position to the disengagement position.

Clutch assembly 206 may overcome spring force F in order to actively reengage first clutch member 222 and second clutch member 224 for a barring application. Stated similarly, system 200 is configured to generate an axial attractive force (AAF, FIG. 1) from the offset centers $EC_S$, $EC_{RR}$ of stator 111 and rotor 113, respectively of starter motor 108 (FIG. 1). In some examples, force AAF may be of greater magnitude than spring force F of biasing spring 250. Therefore, spring force F should be selected to meet the needs of the application, as the AAF will generally scale with the size of the machine, and may change based on the shape and topology of stator 111 and rotor 113. In some examples, which are not intended to be limiting, the AAF may be in a range of from about 5 Newtons (N) to about 1000 N, such as from about 10 N to about 150 N. The word "about," as used herein, encompasses values within plus or minus five percent of the stated value.

Biasing spring 250 may be mechanically supported by one or more spring supports 252. Springs supports 252 may be configured to anchor and/or secure the ends of spring 250. Spring supports 252 may be mounted on first shaft 214, second shaft 216, both, or on another part of system 200.

Figure 5:
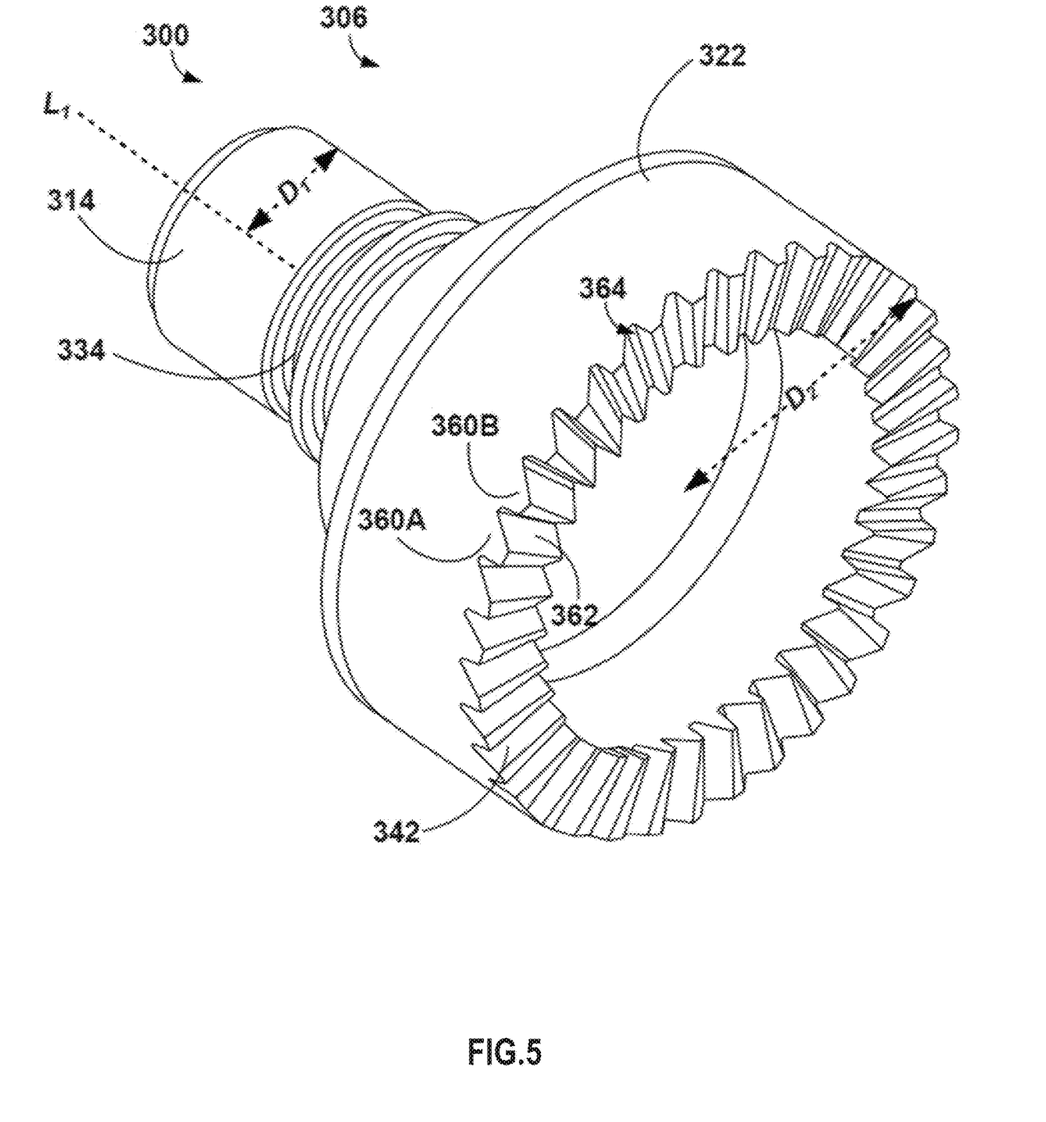
FIG. 5 illustrates an example portion of an example clutch assembly according to the present disclosure.

FIG. 5 illustrates first lock plate 322 of example clutch assembly 306 of system 300. Clutch assembly 306 may be an example of clutch assembly 106 of FIG. 1, and first lock plate 322 may be an example of first clutch member 122.

In the illustrated example, rather than a splined shaft and hub arrangement as illustrated above with respect to clutch assembly 106, first clutch member 322 and the second clutch member (not illustrated) are opposing lock plates, and first clutch member 322 may also be referred to as first lock plate 322. Although only first lock plate 322 is shown in FIG. 5, the second clutch member (not illustrated) may be a similar lock plate configured to oppose and interface with first clutch member 322.

First lock plate 322 defines a surface 342 that has a larger diameter $D_2$ than diameter $D_1$ of first shaft 314. Although illustrated and described herein as a circular lock plate having a diameter, it is also considered that lock plate 322 may define another cross-sectional shape taken along an axial plane, and the shape may have at least one dimension that is larger than diameter $D_1$ of first shaft 314.

First lock plate 322 defines a plurality of teeth 360A, 360B (collectively "teeth 360"). At least one tooth 360A of teeth 360 may be asymmetrical, in that a plane passing through tooth 360A and central axis $L_1$ does not cut the tooth into equal volumes. Rather, tooth 360A defines a sloped face 362 relative to a face cut along a radial cross-section of first lock plate 322. The second lock plate (not illustrated) may have teeth configured to intermesh and seat with grooves 364 between teeth 360. As such, the interfacing teeth may be configured to transfer rotational motion between first lock plate 322 and the second lock plate. Relative to the splined shaft and hub arrangement illustrated and described above, the lock plate arrangement of FIG. 5 may provide similar or increased surface area for engagement between the two clutch members over a shorter axial distance, which may be desirable in some instances, and may allow for implementation smaller systems, or in systems with alternative arrangements. For example, a lock plate arrangement may advantageously allow for reduced volume or weight of clutch assembly 306.

In some examples, a distance between the engagement position and the disengagement position of the clutch assembly may be separated by a distance of from about 1 millimeter (mm) to about 10 mm, or from about 3 millimeters (mm) to about 10 mm. In examples nearer to the bottom end of the range, a lock plate arrangement may be desirable.

Figure 6:
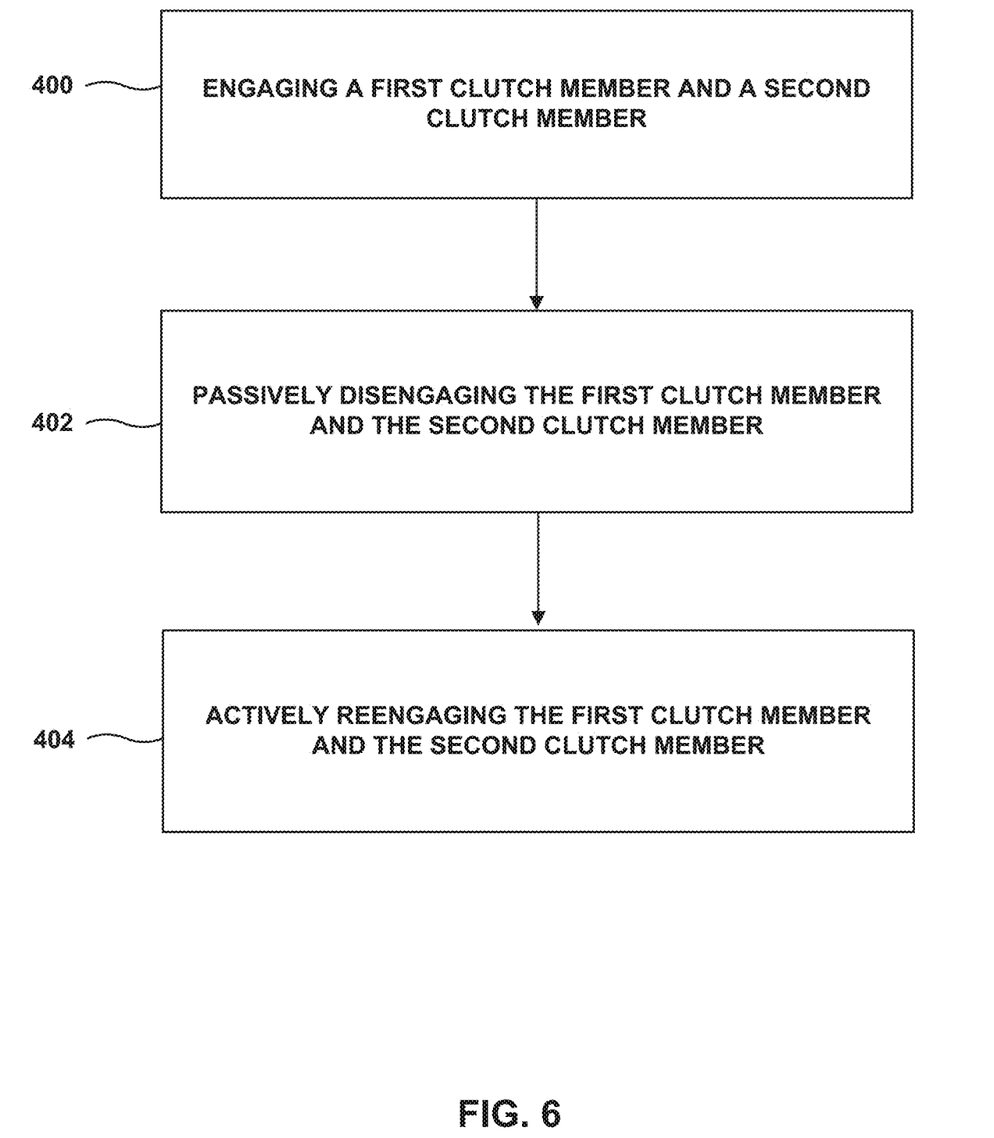
FIG. 6 is a flowchart illustrating an example technique according to the present disclosure.

FIG. 6 is a flowchart illustrating an example technique for operating a clutch assembly according to the present disclosure. Although primarily described herein with respect to clutch assembly 106 of FIGS. 1-3B, clutch assembly 206 of FIGS. 4A and 4B, and clutch assembly 306 of FIG. 5, the illustrated technique may be performed with another clutch assembly, and other clutch assemblies may be used to perform the illustrated technique.

With concurrent reference to FIGS. 1-3B and FIG. 6, the technique of FIG. 6 includes engaging first clutch member 122 and second clutch member 124 (400). Step 400 may occur at a first time, such as, for example, during a starting of gas turbine engine 102. First clutch member 122 is disposed near first end 134 of first shaft 114. First clutch member 122 defines first surface 142. Starter motor 108 may be coupled to a second end of first shaft 114. Second clutch member 124 may be disposed near first end 136 of second shaft 116. Second clutch member 124 member may define second surface 144 opposing first surface 142, and accessory gearbox 104 of gas turbine engine 102 may be coupled to a second end of second shaft 116. When first clutch member 122 is engaged with second clutch member 124, first surface 142 of first clutch member 122 engages second surface 144 of second clutch member 124 such that rotational motion may be transferred between first clutch member 122 and second clutch member 124.

The technique of FIG. 6 also includes passively disengaging first clutch member 122 and second clutch member 124 (402). In some examples, passively disengaging first clutch member 122 and second clutch member 124 may include disengaging first clutch member 122 and second clutch member 124 from each other mechanically without a signal from control circuitry of controller 110. In some examples, step 402 may occur at a second time that is after the first time, such as, for example, at the conclusion of a starting operation of gas turbine engine 102 or during a cruising operation of gas turbine engine 102.

In some examples, starter motor 108 may to apply a torque $T_1$ to first shaft 114 which causes first shaft 114 to rotate about first shaft central axis $L_1$. Gas turbine engine 102, via accessory gearbox 104, may apply torque $T_2$ to second shaft 116 which causes second shaft 116 to rotate about second shaft central axis $L_2$. In some examples, step 402, passively disengaging first clutch member 122 and second clutch member 124 may include applying torque $T_2$ to second shaft 116 that exceeds torque $T_1$ applied to first shaft 114. In some examples, step 402, passively disengaging first clutch member 122 and second clutch member 124 may include axially translating first shaft 114 from an engagement position (FIG. 3A) where first clutch member 122 is engaged with second clutch member 124 to a disengagement position (FIG. 3B) where first clutch member 122 and second clutch member 124 are disengaged.

With reference to FIG. 4A, FIG. 4B, and FIG. 6, in some examples step 402, passively disengaging first clutch member 122 and second clutch member 124, may include applying spring force F from biasing spring 250 to assist in translating first shaft 114 from the engagement position (FIG. 4A) to the disengagement position (FIG. 4B). In some examples, the engagement position and the disengagement position may be separated by a distance of from about 1 mm to about 10 mm, or from about 3 mm to about 10 mm.

The technique of FIG. 6 also includes actively reengaging first clutch member 122 and second clutch member 124 (404). Step 404 may occur at a third time, which may be after the second time, such as during a re-start operation or during a barring operation of gas turbine engine 102. In some examples, actively engaging first clutch member 122 and second clutch member 124 may include delivering a signal from control circuitry of controller 110. In some examples, step 404, actively reengaging first clutch member 122 and second clutch member 124 may include engaging a plurality of helical splines 130 disposed spirally about the circumference of first shaft 114 with hub 140. Hub 140 may define a plurality of helical grooves 132 configured to receive helical splines 130. In some examples, each respective helical spline 130A of plurality of helical splines 130 may define spline width $W_S$. Similarly, each helical groove 132A of plurality of helical grooves 132 may define groove width $W_G$. In some examples, the magnitude of groove width $W_G$ may be larger than the magnitude of spline width $W_S$. In some examples, at least one spline 130A of splines 130 may define a bullnose shape (FIG. 2B) at first end 146 of first clutch member 122. The bullnose shape may be configured to reduce material stresses induced by engagement with hub 140. In some examples, the technique of FIG. 6 further includes delivering a signal, via control circuitry of controller 110, to actively reengage first clutch member 122 and second clutch member 124 with each other.

Referring now to FIGS. 5 and 6, in some examples, first clutch member 322 may be a first lock plate 322. First lock plate 322 may define diameter $D_2$, which may be larger than diameter $D_1$ defined by first shaft 114. In some examples, the second clutch member (not pictured in FIG. 5) may be a second lock plate that defines a larger diameter than the second shaft. Each of first lock plate 322 and the second lock plate may define a plurality of teeth 360. At least one tooth 360A of teeth 160 defined by first lock plate 322 may be an asymmetrical tooth which defines a sloped face 362 disposed at an acute angle relative to a face of first lock plate 322. In some examples, each of teeth 360 may be asymmetrical, and may be configured to intermesh with a corresponding tooth of the second lock plate (not illustrated) such that rotational motion may be transferred.

Referring back to FIGS. 1-3B and 6, in some examples, actively reengaging first clutch member 122 and second clutch member 124 may include generating an axial force on first shaft 114 by supplying energy to starter motor 108. In some examples, generating the axial force may include using the axial attractive force (AAF) by offsetting the electrical centers of stator 111 and rotor 113 along axial axis A (FIG. 1.).

In some examples, actively reengaging first clutch member 122 and second clutch member 124 may include operating speed matching system 119. Operating speed matching system 119 may include rotating first shaft 114 about first shaft central axis $L_1$ at substantially the same rotational speed that second shaft 116 is rotating about central axis $L_2$, such that first clutch member 122 and second clutch member 124 are rotating at substantially the same rotational speed when they actively reengage with each other. In some examples, speed matching system 119 may include first speed sensor 115 on first shaft 114 and second speed sensor 117 on second shaft 116.

In some examples, the technique of FIG. 6 may further include operating gas turbine engine 102. Operating gas turbine engine 102 may include engaging first clutch member 122 and second clutch member 124 during a starting operation, passively disengaging first clutch member 122 and second clutch member 124 during a cruise operation of gas turbine engine 102, and actively reengaging first clutch member 122 and second clutch member 124 during a barring operation of gas turbine engine 102.

Various examples have been described. These and other examples are within the scope of the following clauses and claims.

Clause 1: A clutch assembly includes a first clutch member disposed near a first end of a first shaft, the first clutch member defining a first surface, and a starter motor coupled to a second end of the first shaft; and a second clutch member disposed near a first end of a second shaft, the second clutch member defining a second surface opposing the first surface, and an accessory gearbox of a gas turbine engine coupled to a second end of the second shaft, wherein, when the first clutch member is engaged with the second clutch member, the first surface of the first clutch member engages the second surface of the second clutch member such that rotational motion is transferred between the first clutch member and the second clutch member, and wherein the first clutch member and the second clutch member are configured to passively disengage from each other and actively reengage with each other.

Clause 2: The clutch assembly of clause 1, wherein the first clutch member and the second clutch member are configured to passively disengage from each other mechanically without being controlled by control logic, and wherein the first clutch member and the second clutch member are configured to actively reengage with each other via a signal from control circuitry of a controller.

Clause 3: The clutch assembly of clause 1 or clause 2, wherein the starter motor is configured to apply a torque to the first shaft which causes the first shaft to rotate about a first shaft central axis, the accessory gearbox of the gas turbine engine is configured to apply a torque to the second shaft which causes the second shaft to rotate about a second shaft central axis, and wherein the first clutch member and the second clutch member are configured to passively disengage from each other when the torque of the second shaft exceeds the torque of the first shaft.

Clause 4: The clutch assembly of any of clauses 1-3, wherein the first shaft is configured to translate axially between an engagement position where the first clutch member is engaged with the second clutch member and a disengaged position wherein the first clutch member and the second clutch member are disengaged.

Clause 5: The clutch assembly of any of clauses 4, further comprising a biasing spring configured to assist in translating the first shaft from the engagement position to the disengagement position.

Clause 6: The clutch assembly of clause 4, wherein the engagement position and the disengagement position are separated by a distance of from about 1 millimeters (mm) to about 10 mm.

Clause 7: The clutch assembly of any of clauses 1-6, wherein the first clutch member comprises a plurality of helical splines disposed spirally about the circumference of the first shaft, and wherein the second clutch member comprises a hub defining a plurality of helical grooves configured to receive the helical splines.

Clause 8: The clutch assembly of any of clause 7, wherein each respective helical spline of the plurality of helical splines of the plurality of splines defines a spline width, and wherein each helical groove of the plurality of helical grooves defines a groove width, and wherein magnitude of the groove width is larger than the magnitude of the spline width.

Clause 9: The clutch assembly of any of clauses 7 or 8, wherein at least one spline of the plurality of splines defines a bullnose shape at a first end configured to reduce material stresses induced by engagement with the hub.

Clause 10: The clutch assembly of any of clauses 1-6, wherein the first clutch member is a first lock plate which defines a larger diameter than the first shaft, and wherein the second clutch member is a second lock plate which defines a larger diameter than the second shaft, and wherein each of the first lock plate and the second lock plate define a plurality of teeth.

Clause 11: The clutch assembly of clause 10, wherein at least one tooth of the plurality of teeth defined by the first lock plate is an asymmetrical tooth defining a sloped face disposed at an acute angle relative to a face of the first lock plate.

Clause 12: The clutch assembly of any of clauses 1-11, wherein, to actively reengage the first clutch member and the second clutch member, an electrical center of a stator of the starter motor and an electrical center of a rotor of the starter motor are electrically axially offset when the first clutch member is in the disengaged position, such that energy supplied to the starter motor generates an axial force on the first shaft sufficient to reengage the first clutch member and the second clutch member.

Clause 13: The clutch assembly of any of clauses 1-12, further comprising a speed matching system, wherein the speed matching system is configured to rotate the first shaft about a central axis at substantially the same rotational speed that the second shaft is rotating about a central axis, such that the first clutch member and the second clutch member are rotating at substantially the same rotational speed when they actively reengage with each other.

Clause 14: The clutch assembly of clause 13, wherein the speed matching system comprises a first speed sensor on the first shaft and a second speed sensor on the second shaft.

Clause 15: The clutch assembly of any of clauses 1-14, further comprising the controller including control circuitry, wherein the controller is configured to deliver a signal to actively reengage the first clutch member and the second clutch member from each other.

Clause 16: The clutch assembly of any of clauses 1-16, further comprising the gas turbine engine, and wherein the first clutch member and second clutch member are configured to be engaged during a starting operation of the gas turbine engine, passively disengaged during a cruise operation of the gas turbine engine, and actively reengaged during a barring operation of the gas turbine engine.

Clause 17: A method of operating a clutch assembly includes engaging, at a first time, a first clutch member and a second clutch member, wherein the first clutch member is disposed near a first end of a first shaft, the first clutch member defines a first surface, and a starter motor is coupled to a second end of the first shaft, wherein the second clutch member is disposed near a first end of a second shaft, the second clutch member defines a second surface opposing the first surface, and an accessory gearbox of a gas turbine engine is coupled to a second end of the second shaft, and wherein, when the first clutch member is engaged with the second clutch member, the first surface of the first clutch member engages the second surface of the second clutch member such that rotational motion is transferred between the first clutch member and the second clutch member; passively disengaging, at a second time that is after the first time, the first clutch member and the second clutch member; and actively reengaging, at a third time that is after the second time, the first clutch member and the second clutch member.

Clause 18: The method of clause 17, wherein passively disengaging the first clutch member and the second clutch member comprises disengaging the first clutch member and the second clutch member from each other mechanically without a signal from control logic.

Clause 19: The method of clause 17 or 18, wherein actively engaging the first clutch member and the second clutch member comprises delivering a signal from control circuitry of a controller.

Clause 20: The method of any of clauses 17-19, wherein the starter motor is configured to apply a torque to the first shaft which causes the first shaft to rotate about a first shaft central axis, the accessory gearbox of the gas turbine engine is configured to apply a torque to the second shaft which causes the second shaft to rotate about a second shaft central axis, and wherein passively disengaging the first clutch member and the second clutch member comprises applying a torque to the second shaft that exceeds a torque applied to the first shaft.

Clause 21: The method of any of clauses 17-20, wherein passively disengaging the first clutch member and the second clutch member comprises axially translating the first shaft from an engagement position where the first clutch member is engaged with the second clutch member to a disengagement position wherein the first clutch member and the second clutch member are disengaged.

Clause 22: The method of clause 21, wherein passively disengaging the first clutch member and the second clutch member comprises applying a spring force from a biasing spring to assist in translating the first shaft from the engagement position to the disengagement position.

Clause 23: The method of clause 22, wherein the engagement position and the disengagement position are separated by a distance of from about 1 millimeters (mm) to about 10 mm.

Clause 24: The method of any of clauses 17-23, wherein actively reengaging the first clutch member and the second clutch member comprises engaging a plurality of helical splines disposed spirally about the circumference of the first shaft with a hub defining a plurality of helical grooves configured to receive the helical splines.

Clause 25: The method of clause 24, wherein each respective helical spline of the plurality of helical splines of the plurality of splines defines a spline width, and wherein each helical groove of the plurality of helical grooves defines a groove width, and wherein magnitude of the groove width is larger than the magnitude of the spline width.

Clause 26: The method of any of clauses 24-25, wherein at least one spline of the plurality of splines defines a bullnose shape at a first end configured to reduce material stresses induced by engagement with the hub.

Clause 27: The method of any of clauses 17-23, wherein the first clutch member is a first lock plate which defines a larger diameter than the first shaft, and wherein the second clutch member is a second lock plate defines a larger diameter than the second shaft, and wherein each of the first lock plate and the second lock plate define a plurality of teeth.

Clause 28: The method of clause 27, wherein at least one tooth of the plurality of teeth defined by the first lock plate is an asymmetrical tooth defining a sloped face disposed at an acute angle relative to a face of the first lock plate.

Clause 29: The method of any of clauses 17-28, wherein actively reengaging the first clutch member and the second clutch member comprises generating an axial force on the first shaft by supplying energy to the starter motor, wherein an electrical center of a stator of the starter motor and an electrical center of a rotor of the starter motor are electrically offset when the first clutch member is in the disengaged position, such that energy supplied to the starter motor generates an axial force on the first shaft sufficient to reengage the first clutch member and the second clutch member.

Clause 30: The method of any of clauses 17-29, actively reengaging the first clutch member and the second clutch member comprises operating a speed matching system which rotates the first shaft about a central axis at substantially the same rotational speed that the second shaft is rotating about a central axis, such that the first clutch member and the second clutch member are rotating at substantially the same rotational speed when they actively reengage with each other.

Clause 31: The method of clause 30, wherein the speed matching system comprises a first speed sensor on the first shaft and a second speed sensor on the second shaft.

Clause 32: The method of any of clauses 17-31, further comprising delivering a signal, via control circuitry of a controller, to actively reengage the first clutch member and the second clutch member from each other.

Clause 33: The method of any of clauses 17-32, further comprising operating the gas turbine engine, and wherein the first clutch member and second clutch member are configured to be engaged during a starting operation of the gas turbine engine, passively disengaged during a cruise operation of the gas turbine engine, and actively reengaged during a barring operation of the gas turbine engine.

What is claimed is:
1. A clutch assembly comprising:
a first clutch member disposed near a first end of a first shaft, the first clutch member defining a first surface, and a starter motor coupled to a second end of the first shaft; and a second clutch member disposed near a first end of a second shaft, the second clutch member defining a second surface opposing the first surface, and an accessory gearbox of a gas turbine engine coupled to a second end of the second shaft, wherein, when the first clutch member is engaged with the second clutch member, the first surface of the first clutch member engages the second surface of the second clutch member such that rotational motion is transferred between the first clutch member and the second clutch member, wherein the first clutch member and the second clutch member are configured to passively disengage from each other and actively reengage with each other, and wherein an electrical center of a stator of the starter motor and an electrical center of a rotor of the starter motor are axially offset when the first clutch member is in the disengaged position, such that energy supplied to the starter motor generates an axial force on the first shaft sufficient to reengage the first clutch member and the second clutch member.

2. The clutch assembly of claim 1, wherein the first clutch member and the second clutch member are configured to passively disengage from each other mechanically without being controlled by control logic, and wherein the first clutch member and the second clutch member are configured to actively reengage with each other via a signal from control circuitry of a controller.

3. The clutch assembly of claim 1, wherein the starter motor is configured to apply a torque to the first shaft which causes the first shaft to rotate about a first shaft central axis, the accessory gearbox of the gas turbine engine is configured to apply a torque to the second shaft which causes the second shaft to rotate about a second shaft central axis, and wherein the first clutch member and the second clutch member are configured to passively disengage from each other when the torque of the second shaft exceeds the torque of the first shaft.

4. The clutch assembly of claim 1, wherein the first shaft is configured to translate axially between an engagement position where the first clutch member is engaged with the second clutch member and a disengaged position wherein the first clutch member and the second clutch member are disengaged.

5. The clutch assembly of claim 4, further comprising a biasing spring configured to assist in translating the first shaft from the engagement position to the disengaged position.

6. The clutch assembly of claim 4, wherein the engagement position and the disengaged position are separated by a distance of from about 1 millimeters (mm) to about 10 mm.

7. The clutch assembly of claim 1, wherein the first clutch member comprises a plurality of helical splines disposed spirally about the circumference of the first shaft, and wherein the second clutch member comprises a hub defining a plurality of helical grooves configured to receive the helical splines.

8. The clutch assembly of claim 7, wherein each respective helical spline of the plurality of helical splines defines a spline width, and wherein each helical groove of the plurality of helical grooves defines a groove width, and wherein magnitude of the groove width is larger than the magnitude of the spline width.

9. The clutch assembly of claim 7, wherein at least one helical spline of the plurality of helical splines defines a bullnose shape at a first end thereof configured to reduce material stresses induced by engagement with the hub.

10. The clutch assembly of claim 1, wherein the first clutch member is a first lock plate which defines a larger diameter than the first shaft, and wherein the second clutch member is a second lock plate which defines a larger diameter than the second shaft, and wherein each of the first lock plate and the second lock plate define a plurality of teeth.

11. The clutch assembly of claim 10, wherein at least one tooth of the plurality of teeth defined by the first lock plate is an asymmetrical tooth defining a sloped face disposed at an acute angle relative to a face of the first lock plate.

12. The clutch assembly of claim 1, further comprising a speed matching system, wherein the speed matching system is configured to rotate the first shaft about a first central axis at substantially the same rotational speed that the second shaft is rotating about a second central axis, such that the first clutch member and the second clutch member are rotating at substantially the same rotational speed when they actively reengage with each other.

13. The clutch assembly of claim 12, wherein the speed matching system comprises a first speed sensor configured to measure the rotational speed of the first shaft and a second speed sensor configured to measure the rotational speed of the second shaft.

14. The clutch assembly of claim 1, further comprising a controller including control circuitry, wherein the controller is configured to deliver a signal to actively reengage the first clutch member and the second clutch member with each other.

15. The clutch assembly of claim 1, further comprising a gas turbine engine, and wherein the first clutch member and the second clutch member are configured to be engaged during a starting operation of the gas turbine engine, passively disengaged during a cruise operation of the gas turbine engine, and actively reengaged during a barring operation of the gas turbine engine.

16. A method of operating a clutch assembly, the method comprising:
engaging, at a first time, a first clutch member and a second clutch member,
wherein the first clutch member is disposed near a first end of a first shaft, the first clutch member defines a first surface, and a starter motor is coupled to a second end of the first shaft,
wherein the second clutch member is disposed near a first end of a second shaft, the second clutch member defines a second surface opposing the first surface, and an accessory gearbox of a gas turbine engine is coupled to a second end of the second shaft,
wherein, when the first clutch member is engaged with the second clutch member, the first surface of the first clutch member engages the second surface of the second clutch member such that rotational motion is transferred between the first clutch member and the second clutch member;
passively disengaging, at a second time that is after the first time, the first clutch member and the second clutch member, wherein an electrical center of a stator of the starter motor and an electrical center of a rotor of the starter motor are axially offset when the first clutch member is in a disengaged position; and
actively reengaging, at a third time that is after the second time, the first clutch member and the second clutch member by supplying energy to a starter motor, wherein supplying energy to the starter motor generates an axial force on the first shaft sufficient to reengage the first clutch member and the second clutch member.

17. The method of claim 16, wherein passively disengaging the first clutch member and the second clutch member comprises disengaging the first clutch member and the second clutch member from each other mechanically without a signal from control logic.

18. The method of claim 16, wherein actively engaging the first clutch member and the second clutch member comprises delivering a signal from control circuitry of a controller.

19. The method of claim 16, wherein the starter motor is configured to apply a first torque to the first shaft which causes the first shaft to rotate about a first shaft central axis, the accessory gearbox of the gas turbine engine is configured to apply a second torque to the second shaft which causes the second shaft to rotate about a second shaft central axis, and
   wherein passively disengaging the first clutch member and the second clutch member comprises applying the second torque to the second shaft that exceeds the first torque applied to the first shaft.

\* \* \* \* \*